United States Patent
Guller et al.

(10) Patent No.: US 10,958,527 B2
(45) Date of Patent: Mar. 23, 2021

(54) TRANSACTION FENCING IN A MULTI-DOMAIN NETWORK

(71) Applicant: International Business Machines Corporation, Armonk, NY (US)

(72) Inventors: Alexander Guller, Ashdod (IL); Constantine Gavrilov, Rishon Le-Zion (IL); Ilya Tkachevsky, Ashdod (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/439,470

(22) Filed: Jun. 12, 2019

(65) Prior Publication Data

US 2020/0396133 A1   Dec. 17, 2020

(51) Int. Cl.
*G06F 15/16* (2006.01)
*H04L 12/24* (2006.01)

(52) U.S. Cl.
CPC ................. *H04L 41/12* (2013.01)

(58) Field of Classification Search
CPC ........................................................ H04L 41/12
See application file for complete search history.

(56) References Cited

U.S. PATENT DOCUMENTS

| | | | | |
|---|---|---|---|---|
| 7,809,898 B1 * | 10/2010 | Kiselev | ............ | G06F 11/2082 711/152 |
| 7,949,636 B2 * | 5/2011 | Akidau | ............ | G06F 11/004 707/640 |
| 7,953,709 B2 * | 5/2011 | Akidau | ............ | G06F 11/0727 707/690 |
| 9,690,703 B1 * | 6/2017 | Jess | ............ | G06F 3/0614 |
| 9,910,618 B1 * | 3/2018 | Curley | ............ | G06F 3/0647 |
| 10,033,516 B2 | 7/2018 | Chen et al. | | |
| 10,721,301 B1 * | 7/2020 | Sampath | ............ | G06F 11/324 |
| 2004/0208197 A1 * | 10/2004 | Viswanathan | ...... | H04L 12/4625 370/466 |
| 2005/0066046 A1 * | 3/2005 | Chadalapaka | ......... | H04L 69/32 709/230 |
| 2007/0022264 A1 * | 1/2007 | Bromling | ............ | H04L 67/1097 711/162 |
| 2007/0288568 A1 * | 12/2007 | Hayter | .................. | G06F 9/546 709/204 |
| 2013/0007368 A1 * | 1/2013 | Sterns | ................. | G06F 12/0868 711/124 |
| 2013/0073751 A1 | 3/2013 | Blocksome et al. | | |
| 2013/0290529 A1 * | 10/2013 | Gordon | ............... | G06F 12/0871 709/224 |

(Continued)

*Primary Examiner* — Hieu T Hoang
(74) *Attorney, Agent, or Firm* — Kunzler Bean & Adamson (57) ABSTRACT

Methods and systems for transaction fencing in a multi-domain network are provided. A system for providing transaction fencing in a multi-domain network includes an error identification module that identifies a communication error between a source domain and a destination node. The communication error is associated with a connection in a plurality of connections between a plurality of domains. Additionally, the system includes a tearing module that disconnects the destination node from the plurality of domains and clears outstanding transactions associated with the destination node in the plurality of domains. Further, the system includes a connection enable module that enables connections between the plurality of domains and the destination node.

20 Claims, 5 Drawing Sheets

(56) References Cited

U.S. PATENT DOCUMENTS

| | | | |
|---|---|---|---|
| 2014/0003441 A1* | 1/2014 | Shachar | H04L 5/0055 370/401 |
| 2015/0254150 A1* | 9/2015 | Gordon | G06F 11/1469 714/6.3 |
| 2016/0094636 A1* | 3/2016 | Carr | H04L 67/1002 709/226 |
| 2017/0255559 A1* | 9/2017 | Burstein | G06F 12/0833 |
| 2018/0152277 A1 | 5/2018 | Chen et al. | |
| 2018/0152278 A1* | 5/2018 | Chen | H04L 67/141 |
| 2018/0165038 A1* | 6/2018 | Authement | G06F 3/0688 |
| 2018/0198593 A1 | 7/2018 | Jiang et al. | |
| 2018/0316760 A1* | 11/2018 | Chernin | G06F 3/067 |
| 2019/0004894 A1* | 1/2019 | Chagam Reddy | G06F 11/1076 |
| 2019/0044827 A1* | 2/2019 | Ganapathi | H04L 41/24 |
| 2019/0129653 A1* | 5/2019 | Yang | G06F 3/0659 |
| 2019/0141016 A1* | 5/2019 | Borrill | H04L 63/0428 |
| 2019/0317901 A1* | 10/2019 | Kachare | G06F 12/0246 |
| 2020/0004606 A1* | 1/2020 | Yanchuleff | G06F 16/1734 |
| 2020/0089648 A1* | 3/2020 | Klein | G06F 12/0246 |

\* cited by examiner

TRANSACTION FENCING IN A MULTI-DOMAIN NETWORK

FIELD

This invention relates to computer networking and more particularly relates to the establishing and tearing of high-speed, low latency computer communications, with reduced messaging traffic overhead between a plurality of domains in a multi-domain computer network.

BACKGROUND

Modern enterprise applications often deploy a grid architecture to provide application services. For example, a plurality of grid nodes may be interconnected with one another using a fast interconnect when providing application services. Interconnect examples may typically include fast Ethernet, Infiniband or other interconnect solutions. To satisfy the complex requirements of enterprise applications, various protocols may be deployed for communications between the various grid nodes. Further, to achieve the desired performance for the enterprise applications, the grid architecture may use interconnect protocols that allow hardware level connections and remote direct memory access (RDMA) transfers. Infiniband and data center bridging (DCB) Ethernet fabrics are examples of interconnect solutions that offer reliable peer-to-peer connections that are implemented at the host channel adapter (HCA) level and that use RDMA protocols.

SUMMARY

Methods and systems for transaction fencing in a multi-domain network are provided. A system for providing transaction fencing in a multi-domain network includes an error identification module that identifies a communication error between a source domain and a destination domain. The communication error is associated with a connection in a plurality of connections between a plurality of domains. Additionally, the system includes a tearing module that disconnects the destination node from the plurality of domains and clears outstanding transactions associated with the destination node. Further, the system includes a connection enable module that enables connections between the plurality of source and destination domains.

In certain embodiments, the tearing module includes a disconnect synchronization module for synchronizing the disconnection of the plurality of domains from the destination node. Also, the tearing module includes a block module that blocks connection requests for the plurality of domains. The connection requests are associated with a destination domain of the destination node. Further, the tearing module includes a disconnect module that disconnects connections between the destination node and one or more domains in the plurality of domains. Additionally, the tearing module includes a flush module that flushes outstanding transactions for one or more other domains that are associated with the destination node.

In additional embodiments, the outstanding transactions include at least one of outstanding initiator transactions; and outstanding target transactions. Further, the flush module marks the outstanding destination transactions as aborted. Additionally, the flush module requests a return of the outstanding initiator and target transactions from the plurality of domains. Also, the flush module processes outstanding completions. Moreover, the disconnect module disconnects the connections by disconnecting send and receive half-duplex connections.

In some embodiments, the tearing module disconnects the connections based on an Infiniband specification. Additionally, the connection enable module fails the destination node if connectivity between the source domain and the destination domain fails to resume. Further, the connection enable module further comprises an unblock module that unblocks connection requests associated with the destination node for the plurality of domains. Also, the plurality of connections between the plurality of domains are established via connecting each source domain to a plurality of destination domains on each destination node using a single half-duplex connection.

One method includes identifying a communication error between a source domain and a destination domain, where the communication error takes place in a connection associated with a plurality of destination domains. Additionally, the method includes disconnecting the plurality of destination domains from the plurality of source domains. Also, the method includes clearing outstanding transactions associated with the plurality of destination domains. Further, the method includes enabling connections between the plurality of source and destination domains.

In certain embodiments, disconnecting the destination node includes synchronizing the disconnection of the plurality of source domains from the plurality of destination domain. Additionally, disconnecting the destination node further includes requesting the plurality of source domains, where established connections associated with the destination node are present. Also, disconnecting the destination node further includes disconnecting connections between the plurality of source and destination domains.

In some embodiments, clearing outstanding transactions includes flushing outstanding transactions for one or more other source domains that are associated with the destination node. Additionally, flushing outstanding transactions includes marking outstanding destination transactions as aborted. Also, flushing outstanding transactions includes requesting a return of outstanding initiator and target transactions from the plurality of domains. Further, flushing outstanding transactions includes processing outstanding completions.

In further embodiments, enabling connections between the plurality of domains and the destination node further includes failing the destination node if connectivity between a source domain and a destination domain fails to resume. Additionally, enabling connections between the plurality of source domains and the destination node further comprises unblocking connection requests between the plurality of source and destination domains.

Also, disclosed are computer program products including a computer-readable storage medium that include program instructions embodied therewith for transaction fencing in a multi-domain network. Some program instructions executable by a processor cause the processor to identify a communication error between a source domain and a destination domain, where the communication error is associated with a connection in a plurality of connections between a plurality of domains. Also, the program instructions cause the processor to disconnect the destination node from the plurality of source domains. Further, the program instructions clear outstanding transactions associated with the destination node in the plurality of source domains. Additionally, the program instructions enable connections between the plurality of domains and the destination node.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Disclosed herein are various embodiments providing methods, systems, and computer program products that can provide transaction fencing in a multi-domain network. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The description of elements in each figure below may refer to elements of proceeding figures. For instance, like numbers can refer to similar elements in all figures, including alternate embodiments of similar elements.

Figure 1:
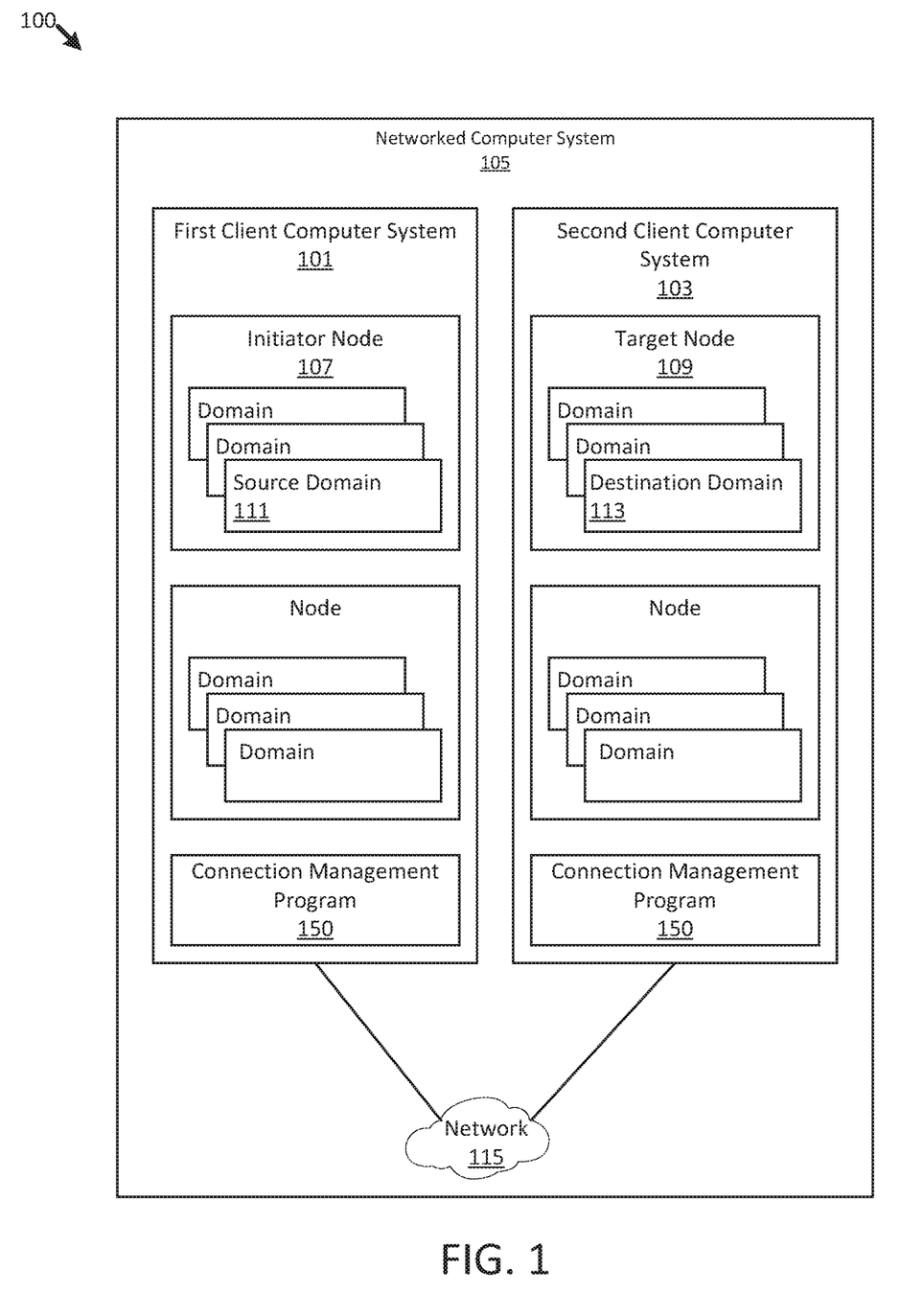
FIG. 1 is a block diagram of one embodiment of a computing system for transaction fencing in a multi-domain environment.

The present invention will now be described in detail with reference to the Figures. FIG. 1 is a functional block diagram depicting one example of a computing environment 100 in accordance with at least one embodiment of the present invention. Computing environment 100 includes: networked computers system 105; first client computer system 101; second client computer system 103; initiator node 107; source domain 111; target node 109; destination domain 113; and network 115. There may be any number of nodes, including for example the initiator node 107, within the first client computer system 101. There may be any number of nodes, including for example the target node 109, within the second client computer system 103. Moreover, within each node (for example, the initiator node 107 and the target node 109), there may be any number of domains (for example respectively, the source domain 111, and the destination domain 113). The first client computer system 101 and the second client computer system 103 can be any of a desktop computer, a laptop computer, a specialized computer server, or any other computer system known in the art. In some embodiments, the first client computer system 101 represents a computer system utilizing clustered computers and components to act as a single pool of resources when accessed through the network 115. In general, the first client computer system 101 is representative of an electronic device, or combination of electronic devices, capable of executing machine-readable program instructions, as described in greater detail below.

In some embodiments, the first client computer system 101 and the second client computer system 103 may communicate using the Infiniband standard and protocols. InfiniBand is a computer-networking communications standard that may be used in a computer network for communication among a plurality of devices. The InfiniBand standard provides descriptions for formats associated with datagrams and other entities of a packet switched network that uses Infiniband or RDMA over converged ethernet (ROCE) transports. The InfiniBand standard also defines a format for management messages which supports common processing, where the management messages are referred to as management datagrams (MAD). Each management datagram contains the same header format that identifies the class of a management message, the attribute, and a method.

The Infiniband standard also defines connection establishment through use of connection management datagrams (CM MAD) requests and replies. Also, Infiniband provides connection management (CM) services, where drivers, stacks and applications have access to the CM services. A target node 109 may be bound to a service ID. An initiator node 107 that attempts to create a connection may create a queue pair (QP) and send a CM connection request to a given target and CM ID. The initiator node 107 specifies, in the CM request, relevant connection-related parameters.

When a request arrives at the target node 109, the target node 109 may forward the request to the application that is bound to the relevant service ID. The application may then see the parameters of the request that were specified by the initiator node 107 and can accept or reject the CM request from the initiator node 107.

If the application rejects the request, it sends a reject message, and releases the CM ID for the target node 109. If the application accepts the request, it creates a QP on the target node 109, and moves the QP to a ready to receive (RTR) state. When the QP is created and changes the state, the QP parameters are derived from the request parameters received from the initiator node 107. The application for the target node 109 may then send a reply to the initiator node 107 describing the target parameters. When the initiator node 107 receives the reply, the initiator node 107 may forward the reply to the application that has sent the initial CM connection request. The application for the initiator node 107 may see the target parameters in the reply and may reject the reply or proceed with establishing the connection. If the application for the initiator node 107 rejects the reply, the application sends a reject message to the target node 109, and the initiator node 107 proceeds with a recovery path programmed in the application. If the application for the initiator node 107 accepts the reply, the initiator node 107 moves its QP to a RTR state and then to a ready to send (RTS) state, (based on the target parameters). The initiator node 107 then sends a ready-to-use (RTU) message and the process of connection establishment is finished on the side of the initiator node 107. When the target node 109 receives the RTU message, the target node 109 either rejects or accepts the RTU message. If the target node 109 rejects the RTU message, the target node 109 sends a reject message to the initiator node 107 and the target node 109 releases the CM ID and QP for the target node 109. If the target node 109 accepts the RTU message, the target QP is moved to an RTS state, and the process of the connection establishment is finished on the side of the target node 109.

Some implementations skip sending the RTU message and instead, move the QP for the target node 109 to an RTS state either immediately after moving to an RTR state or upon first reception of data. Each message type (for example, "request," "reply," and "ready-to-use," etc.) allows sending and receiving of private data, the meaning of which is not defined by the Infiniband standard and is reserved for application use.

Modern interconnects are powerful. For example, a dual port full duplex interconnect with support of 100 Gbit/sec for each port, can process over 12 million 4 Kilobyte messages per second. It is not possible to process that many messages using a single hardware queue, interrupt line or processor. At the same time, modern interconnects support over one hundred hardware queues and over one hundred interrupt lines and are installed in computers that have large numbers of CPUs (numbers in the range 40-128 are typical for modern servers). Multiple application threads are required to utilize interconnect capabilities and satisfy I/O service requirements for applications deployed in data centers. With large number of CPUs (40-128) and non-uniform memory access (NUMA) constraints, it is not possible to share connections across threads, because of the prohibitive cost of locking, connection sharing, and error recovery. A multi-domain approach is suggested instead. With a multi-domain approach, each application thread opens a private device context, creates its own completion queues and connections. There is no locking penalty for posting send and receive requests or for processing completions. The traffic control issues are handled by hardware flow controls, and one domain cannot penalize connections of other domains. Since all domain objects are children of the same private device context, the error recovery flows and device context events, as well as, transmission completions can be handled within each domain and do not affect other domains.

A conventional approach for multi-domain connectivity (discussed in the paragraph above) is to use reliable connections (RC). Reliable connections are full duplex and allow both sides of the connection to exchange data. A reliable connection connects just two domains (two device contexts) and cannot be used to exchange data with more than one remote domain. To establish full connectivity in a communications fabric with M modules and N domains, each module needs to establish M×N×N connections. This can become a serious problem in modern systems. If we consider a modest system with 10 servers, each running 100 threads (on 100 CPUs), we need 100,000 connections. It is difficult (and/or impractical) to establish such a large number of connections. Moreover, interconnects have limits on how many connections can be created or used without adversely affecting performance.

Another approach to implement a multi-domain concept is the use of extended reliable connections (XRC). An XRC connection allows the establishment of a single domain connection with a destination node (such as the target node 109). An XRC connection is then able to send data to all domains in the target node 109. An XRC connection works with shared receive queue objects (SRQs). For example, while a connection establishment involves communication between a pair of domains, which in this example, a connection request is sent from a single source domain 111 to a single destination domain 113, once the connection is established, the source domain 111 can send data to any shared receive queue of the target node 109, and the sent data will be received in the context of the destination domain 113 that owns the destination SRQ. In this way, an XRC connection becomes domain-to-node connection, connecting one source domain 111 to a plurality of remote domains. Use of XRC connections reduces the number of connections since each source domain 111 needs but a single connection to a target node 109 and does not require separate connections to all domains of the target node 109. Accordingly, to establish full connectivity in the communications fabric with M modules and N domains, each module needs to establish just M×N connections.

XRC connections are half-duplex. Infiniband or ROCE connections are represented by objects called queue pairs (QPs) that exist on the initiator nodes 107 and target nodes 109. The QPs (in conventional reliable connections) comprise send and receive queues and each side of the connection can send and receive data. Conversely, in the case of XRC QPs, the initiator node 107 is of an XRC send type and only has a send queue. The target node 109 is also of an XRC receive type and does not have a send queue or a receive queue. Accordingly, for the target node 109 to receive data, the target node 109 can use an SRQ that belongs to the same XRC domain (the SRQs can belong to different device contexts but can still be in the same XRC domain). Thus, the XRC receive QP is a simple multiplexer that just checks its state (connected or disconnected) and forwards data to the appropriate application domain by placing the data into the domain SRQ.

While the use of XRC decreases the number of connections and makes a multi-domain approach feasible on modern systems, XRC also presents its own unique challenges. Some data center applications use transactions that may require full duplex multi-domain node-to-node connectivity—one side sends data and expects to receive a reply, while the other side also wants to send data and receive replies. A given I/O transaction may send a request and expect to receive data in response to the request. The requesting side can complete its I/O transaction only upon the reception of data. To answer application requirements for full-duplex multi-domain node-to-node connectivity, a plurality of half duplex connections may be created between initiator nodes 107 and target nodes 109. Each side of a half-duplex connection may use a send XRC QP in a connected state. The initiator node 107 and target node 109 may be unable to exchange transactions until the establishment of multiple half-duplex connections completes. Also, having a send and receive channel in a connected state in a given source domain 111 does not mean the source domain 111 can exchange data with any destination domain 113. Having a connected local send channel means that a source domain 111 can send data to one or more destination domains 113, but in order to receive data from a destination domain 113, the destination domain 113 needs to connect to the initiator node 107, and the connection between the destination domain 113 and the initiator node 107 may be serviced by a different initiator domain that is not controlled by the source domain 111.

A similar challenge exists when connections are torn up and transactions between different domains are flushed. A typical transaction (for example a storage transaction) may include sending a packet describing a data fetch request, that specifies the origin of data and the local addresses to store the requested data. The request is sent over an XRC send QP that is controlled by the source domain 111 and specifies the SRQ number of the destination domain 113. The transaction request is received on a remote domain 113 and processed in the context of the remote domain 113. When the remote domain 113 has fetched the required data, it may perform a remote RDMA write to the addresses specified in the transaction, and send a reply to the source domain 111. Both the RDMA write and the reply are sent over send XRC QP belonging to the destination domain 113, and the send operations use memory keys, addresses, and the SRQ number of the source domain 111. However, the connectivity of the target domain 113 to the initiator node 107 may be controlled by the initiator domain that is different from the source domain 111 that has sent the request. For example, in a pair of nodes that each have two domains (1 and 2), domain-1 of each node may establish connectivity with the peer node using remote domain-1, while domain-2 of each node may establish connectivity with the peer node using remote domain-2. When domain-1 of the initiator node 107 sends transactions to remote domain-2, it may use the domain-1 source connection. When domain-2 replies to the transaction received from domain-1, it may use the domain-2 destination connection. Thus, the ability to send the transaction is controlled by domain-1 connectivity on the source node, while ability to receive the reply is controlled by the connectivity of domain-2 on the initiator node 107 that is not controlled by domain-1. When a reply is controlled by domain-2 connectivity but may modify the memory controlled by domain-1, a problem of flushing transactions is presented. For example, when domain-1 on the initiator node 107 disconnects from the target node 109, the initiator node 107 may want to insure that the memory it owns will not be modified by a remote node. When an I/O transaction is in flight and the source domain 111 does not synchronize a disconnect from all source domains to the destination, stale data can be read by a remote domain or stored by a remote domain when a source domain 111 disconnects from the remote node. Establishing and tearing a plurality of connections without synchronizing node-to-node connectivity and returning transactions, presents a possibility of data corruption and creating data inconsistencies (DI).

As described above, the first client computer system 101 and the second client computer system 103 may communicate using standards and protocols described above, such as the Infiniband standard. Domains (for example, the source domain 111) may communicate with other domains (for example, the destination domain 113) within the networked computer system 105. The source domain 111 and the destination domain 113 may be on the same note, different nodes on the same client computer system, or on nodes on different client computer systems (for example, the initiator node 107 and the target node 109 as shown in FIG. 1). In some embodiments, a node, such as the initiator node 107 and the target node 109, may be applications running on a client computer system (for example, the initiator node 107 running on the first client computer system 101). Also, a domain may be an instance of an application running on a client computer system. For example, the source domain 111 may be an instance, potentially among many instances, of an application running on the first client computer system 101.

In certain embodiments, the networked computer system 105 may provide full-duplex connectivity between any two domains in a multi-domain computing environment 100, such as when the multi-domain computing environment 100 is an Infiniband or ROCE environment as described above. For example, a connection between a source domain 111 and a destination domain 113 may be established using a single connection management identifier, a single connection management program (for example, a conventional interconnect low-level API), and private payloads in connection management datagrams to drive the full-duplex connectivity over a pair of half-duplex connections. In some implementations, the half-duplex connections between the source domain 111 and the destination domain 113 may be established using a connection request and a connection ID object. A connection management program 150 may provide an interface between the source domain 111 and the destination domain 113. Further, the connection management program 150 may handle communications across the half-duplex connections while the connected applications executing on the connected domains operate as if they are communicating over a full-duplex connection.

In some embodiments described herein, components of the networked computer system 105 may form a grid block scalable enterprise storage system based on a grid array of hardware components. The networked computer system 105 may also attach to both Fiber Channel Protocol (FCP) and IP network Small Computer System Interface (ISCSI) capable hosts. Additionally, the networked computer system 105 may grow in capacity without the need to manage multiple tiers of storage. Moreover, the networked computer system 105 may handle mixed or random access workloads that may include online transaction processing, video streaming, images, email, and emerging workload areas, such as Web 2.0 and cloud storage. The networked computer system 105 may further support a wide range of enterprise features, including hardware redundancy, synchronous and asynchronous mirroring, thin provisioning, data migration, quality of service controls, support for virtualization platforms, differential snapshots, compression, data deduplication, encryption, etc. Also, the networked computer system 105 may provide internal interconnect support for fourteen data rate (FDR) Infiniband and may support multiple node types.

In further embodiments, the networked computer system 105 may include one, or more, of the following features, characteristics and/or advantages: (i) introduces a concept of multi-domain interconnect; (ii) I/O services (cache node, compression node, interface node, gateway node) work with multiple worker threads (also called domains); (iii) each domain works with its own objects to minimize locking and inter-thread communication; (iv) each domain has a private interconnect context, and private connections to other nodes; (v) avoids locking on interconnect objects (locking inhibits high I/O rates on non-uniform memory access (NUMA) systems); (vi) uses private send and receive queues, signaled by private interrupt lines for each domain, that allow resource optimization and easy I/O processing (post and completions) from the domain context; and/or transaction fencing in a multi-domain network; and (vii) all connectivity and I/O events (errors and notifications) are easily processed in the domain context.

In certain embodiments, applications executing on the domains and the domains may be aware of a desired connectivity map. Also, a grid management solution may provide information to the applications about present and removed nodes. Accordingly, the networked computers system 105 may perform an initial connectivity jump-start. Further, source domains 111 may use shared memory to store and update states in a multi-threaded environment.

Additionally, embodiments described herein may provide inter-domain communication. In particular, a domain may be able to send small messages to other domains within the same node. For example, the source domain 111 may be able to send small messages to other domains within the initiator node 107 and the destination domain 113 may be able to send small messages to other domains within the target node 109. When sending a message to another domain within the same node, an event descriptor may be saved within a domain queue associated with the target domain. For example, when the source domain 111 sends a message to another domain within the initiator node 107, the source domain 111 may post to a queue associated with the initiator node 107, which posting may trigger an event descriptor for the queue. When the event descriptor is triggered, the other domain in the initiator node 107 may become aware that the event queue has a new message and the other domain may then retrieve and process the message. In an alternative embodiment, the event queue may be a socket that is bound to a multicast address and may use reliable datagram transport. For example, the source domain 111 may broadcast a message to all the domains in the initiator node 107 that are associated with the multicast address.

In certain embodiments, domains within a node may be connected to the other local domains. Additionally, transactions may be allowed between a domain on a node with domains on other nodes within the networked computer system 105. During a transaction, different domains associated with the transaction may encounter a communication error. As used herein, a communication error may refer to an event that negatively affects the execution of a transaction between different domains. For example, a communication error may take place if a disconnect request has been made on one of the sides of the connection or if a transport error has taken place. Additionally, a communication error may take place when an application is failed by a grid manager, when a transaction experiences a timeout, when an application fails to drain its completion queue within a specific period, when there is a physical problem with a link, or when an application migrates to a different port due to the addition of new links added or the removal of existing links.

When a source domain 111 determines that a communication error has occurred on the connection to destination domain 113, a connection management program 150 may block connection requests associated with the plurality of destination domains 113 on the destination node 109. For example, the source domain 111 that encountered the communication error may check whether connection requests to the destination node 109 are actively blocked. The source domain 111 may check that connection requests are actively blocked by accessing a shared memory and checking a connection block indicator stored in the shared memory. If the indicator indicates that connections requests are not actively being blocked, the source domain 111 or connection management program 150 may set the connection block indicator to indicate that connection requests are blocked for the plurality of destination domains 113. Also, a block counter may be set to indicate the number of source domains 111 that are in communication with the destination node 109 that has experienced the communication error. Additionally, the connection management program 150 may send the source domains 111 in communication with the destination node 109 a message indicating that the source domains 111 should be blocking connection requests.

When a source domain 111 receives the block message, the source domain 111 may mark the destination node 109 as blocked in a connectivity matrix maintained by the source domain 111 or the node associated with the source domain 111. When a connectivity matrix indicates that certain domains are blocked, the source domain 111 will not send further connection requests to the blocked destination domain 113. Similarly, the source domain 111 may not allow connection requests from the blocked destination domain 113. Each source domain 111 may atomically decrement and check the block counter. Once the source domains 111 have blocked the destination node 109, as indicated by the value of the block counter reaching zero, connections to the destination node 109 (and the destination domains 113) may be disconnected.

When the last source domain 111 blocks connection requests to and from the destination node 109, the source domain 111 may initialize a disconnect counter. The disconnect counter may be initialized to the number of source domains 111 that are communicating with the destination node 109. Further, the last source domain 111 to block connection requests may send a disconnect message to the other source domains 111. When the source domains 111 receive the disconnect message, a source domain 111 may perform a disconnect process that disconnects the source domain 111 from the destination node 109 (the plurality of destination domains 113). In certain embodiments, disconnecting a source domain 111 from a destination node 109 is an asynchronous process. Also, to disconnect a source domain 111 from a destination node 109, both the send and receive channels may be disconnected. Also, the connection management program 150 may flush pending I/O completions. When a source domain 111 completes disconnecting from the destination node 109, the source domain 111 may atomically decrement and check the disconnect counter.

In some embodiments, the source domains 111 disconnect and decrement the disconnect counter until the value of the counter reaches zero, which indicates that the source domains 111 have completed disconnecting from the destination node 109. The source domain 111 that is the last to disconnect from the destination node 109, may initialize a flush transactions counter. The flush transactions counter may be initialized to the number of source domains 111 that communicate with the destination node 109. Additionally, the source domain 111 that is the last to disconnect may send a flush outstanding transactions message to all source domains 111. When each source domain 111 receives the flush outstanding transactions message, the respective source domains 111 may flush both initiator and target transactions. For example, pending initiator transactions may be returned with an aborted status. Also, pending target transactions may be aborted or marked to be aborted when they cannot be immediately aborted because a background load or store operation is in progress and transaction holds a reference. Once the background operation completes, the target transaction can be aborted and released. Upon completion of the flushing of transactions associated with the destination node 109, source domains 111 will not attempt to write data to the memory of the destination node 109, nor attempt to read stale memory from the destination node 109. Either immediately or eventually, outstanding transactions with the destination node 109 may return with an aborted status. Further, the source domains 111 decrement and check the flush transactions counter.

In some embodiments, when the flush transactions counter reaches zero, which indicates that the last of the source domains 111 has completed flushing transactions, connections with the destination node 109 (and the destination domains 113) may be unblocked. For example, the source domain 111 that is the last to flush transactions associated with the destination node 109 may unset the connection block indicator for the destination node 109. Further, the source domain 111 that is the last to flush transactions may send an unblock message to the other source domains 111.

Figure 2:
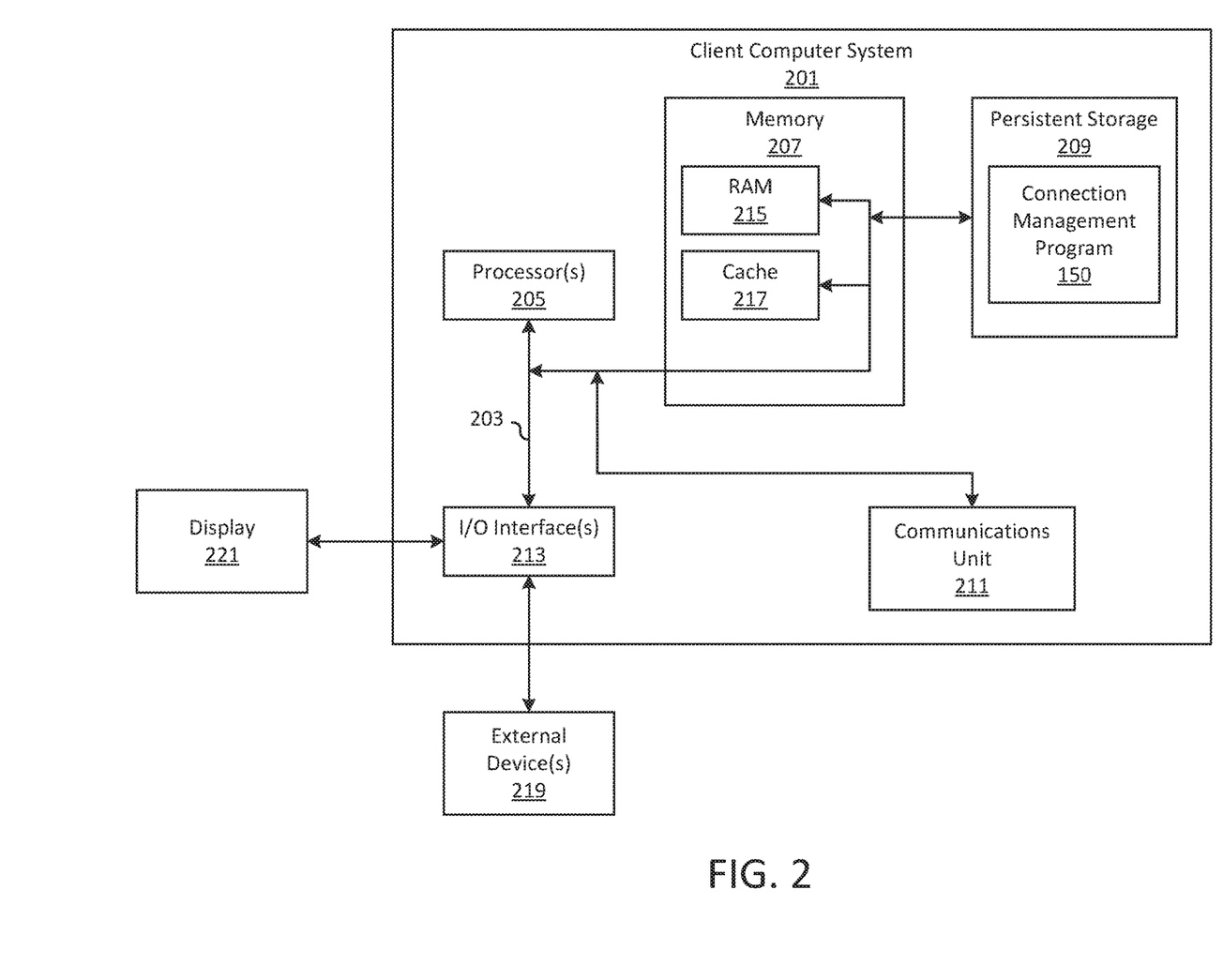
FIG. 2 is a block diagram illustrating components of a computing system configured to provide transaction fencing in a multi-domain environment.

FIG. 2 depicts a block diagram of components of a client computer system 201. The client computer system 201 may be similar to the first client computer system 101 or the second client computer system 103. It should be appreciated that FIG. 2 provides only an illustration of one implementation and does not imply any limitations with regard to the environments in which different embodiments may be implemented. Many modifications to the depicted environment may be made.

As depicted, the client computer system 201 may include a communication fabric 203, which provides communications between a computer processor(s) 205, a memory 207, persistent storage 209, a communications unit 211, and an input/output (I/O) interface(s) 213. The communications fabric 203 may be implemented with any architecture designed for passing data and/or control information between processors (such as microprocessors, communications and network processors, etc.), system memory, peripheral devices, and any other hardware components within a system. For example, communications fabric 203 may be implemented with one or more buses.

The memory 207 and the persistent storage 209 may be computer-readable storage media. In this embodiment, the memory 207 may include a random-access memory (RAM) 215 and a cache memory 217. In general, the memory 207 may include any suitable volatile or non-volatile computer-readable storage media.

One or more programs may be stored in the persistent storage 209 for access and/or execution by one or more of the respective computer processors 205 the one or more memories of the memory 207. In certain embodiments, the persistent storage 209 may include a solid-state hard drive, a semiconductor storage device, read-only memory (ROM), erasable programmable read-only memory (EPROM), flash memory, or any other computer-readable storage media that is capable of storing program instructions or digital information.

The media used by the persistent storage 209 may also be removable. For example, a removable hard drive may be used for the persistent storage 209. Other examples include optical and magnetic disks, thumb drives, and smartcards that are inserted into a driver transfer onto another computer-readable storage medium that is also part of the persistent storage 209.

The communications unit 211, in certain examples, may provide for communications with other data processing systems or devices. In some examples, the communications unit 211 may include one or more network interface cards. The communications unit 211 may provide communications through the use of either or both physical and wireless communications links.

The I/O interface(s) 213 may allow for input and output of data with other devices that may be connected to the client computer system 201. For example, the I/O interface 213 may provide a connection to external devices 219 such as a keyboard, keypad, a touchscreen, and/or some other suitable input device. The external devices 219 may also include portable computer-readable storage media such as, for example, thumb drives, portable optical or magnetic disks, and memory cards. Software and data used to practice embodiments described herein may be stored on such portable computer-readable storage media and may be loaded onto the persistent storage 209 via the I/O interface(s) 213. The I/O interface(s) 213 may also connect to a display 221. The display 221 may provide a mechanism to display data to a user and may be, for example, a computer monitor.

Figure 3:
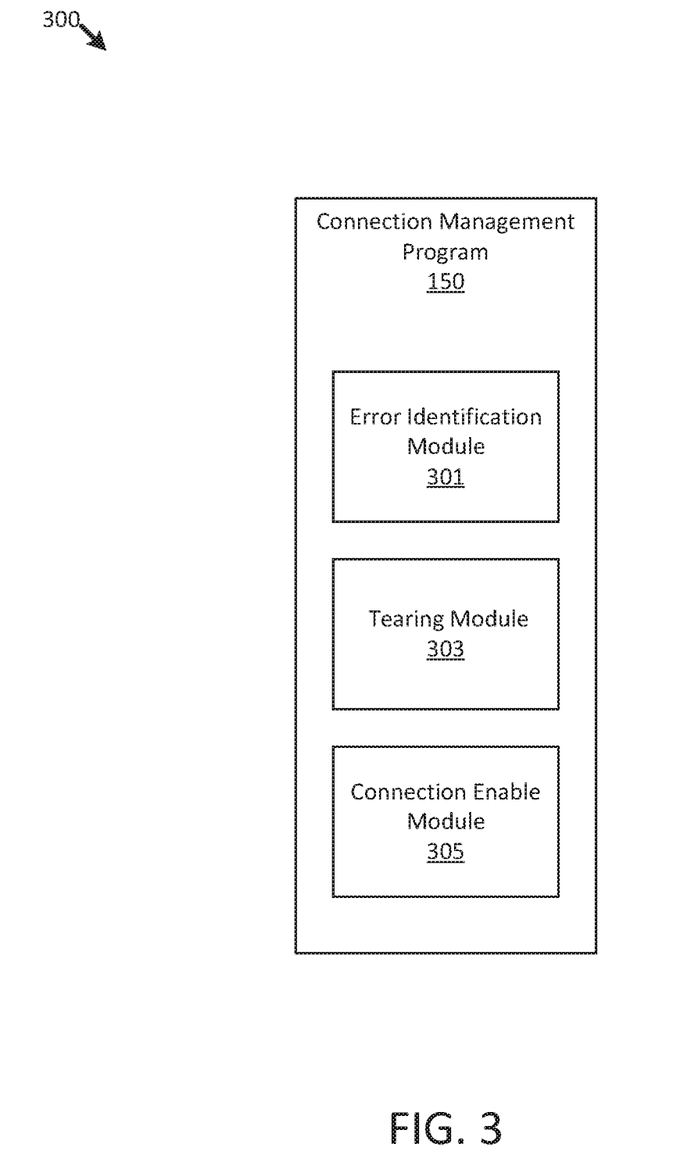
FIG. 3 is a block diagram illustrating one embodiment of a connection management program for providing transaction fencing in a multi-domain network.

FIG. 3 is a block diagram illustrating an embodiment of a connection management program 150 for providing transaction fencing in a multi-domain network. In certain embodiments, as used herein, the connection management program 150 may be executed by a general-purpose computer, special-purpose computer, multiple processors (such as processor(s) 205), or other programmable data processing apparatus. In some embodiments, the connection management program 150 may execute on one or more processors within the networked computer system 105 to provide transaction fencing in a multi-domain network as described above in connection with FIG. 1. For example, the connection management program 150 may include an error identification module 301, a tearing module 303, and a connection enable module 305. As described herein, the error identification module 301 may identify a communication error between a source domain 111 and a destination domain 113. As described herein, the tearing module 303 may disconnect the source node 107 and the destination node 109, which may involve disconnection of the plurality of source domains 111 from the plurality of destination domains 113 and clearing outstanding transactions associated with the affected source domain 111 and destination domain 113. Further, as described herein, the connection enable module 307 may enable connections between the plurality of source domains 111 and the plurality of destination domains 113.

In certain embodiments, the error identification module 301 may identify communication errors that are associated with a connection in a plurality of connections between a plurality of domains. For example, the source domain 111 may be connected to the destination domain 113. In some embodiments, the source domain 111 may establish a connection with the destination domain 113 via a pair of half-duplex send connections between the source domain 111 and the destination domain 113. During communications between the source domain 111 and the destination domain 113, a communication error may arise in one of the connections. Similar to the connection errors described above, a communication error may arise with respect to a transaction between the source domain 111 and the destination domain 113 when an event disrupts a connection between the source domain 111 and the destination domain 113.

In some embodiments, when the error identification module 301 identifies a communication error, the tearing module 303 may disconnect the source node 107 from the destination node 109 and clear outstanding transactions associated with all affected source domains 111 and destination domains 113. Domains of both initiator and target nodes can bear send roles. For example, when the initiator domain initiates a transaction to be completed by the target domain, the initiator domain may be a source domain 111 and the target domain may be a destination domain 113. Alternatively, when the target domain initiates a transaction to be completed by the initiator domain, the initiator domain may be a destination domain 113 in the transaction and the target domain may be a source domain 111 in the transaction. Both the source domain 111 and the destination domain 113 may receive an event indicating that a communication error has occurred. In the case of source side of the communication, the errors are received on send channel of the communication and may indicate a dead destination node, a failed link, or active disconnect request from the destination. In the case of destination side of the communication, the errors are received on receive side of the communication, and may indicate a dead source node, a failed link, or active disconnect request from the source node. Alternatively, communication errors may be caused by timeouts to complete or abort transactions. When the communication error is generated, the tearing module 303 may begin to disconnect the source node 107 from the destination node 109 and clear outstanding transactions in all source domains 111 of the source node 107. For example, the tearing module 303 may disconnect the destination node 109 from other source domains 111 and prevent the destination node 109 from forming new connections while the tearing module 303 clears the transactions. In some implementations, the tearing module 303 may disconnect the destination node 109 from other source domains 111 based on the Infiniband specification. In particular, the Infiniband specification defines connection management services and the tearing module 303 may use the connection management services to disconnect the destination node 109 from other source domains 111.

When the tearing module 303 disconnects the destination node 109 (e.g., by disconnecting a plurality of destination domains 113 from the other source domains 111) and completes flushing outstanding transactions associated with the plurality of destination domains 113, the connection enable module 305 may enable connections between the plurality of destination domains 113 and all source domains 111. For example, where the tearing module 303 directs the connection management program 150 to prevent the destination domains 113 from forming new connections with the source node 107, the connection enable module 305 may direct the connection management program 150 to allow the formation of new connections between source domains 111 and destination domains 113. With respect to the destination domains 113, the connection enable module 305 may direct the connection management program 150 to allow the formation of new connections with the source domains 111.

In further embodiments, when the connection enable module 305 directs the connection management program 150 to allow the formation of new connections with the destination node 109 (and destination domains 113), if a specific source domain 111 fails to resume connectivity with the destination domains 113, the connection enable module 305 may fail the destination node 109.

Figure 4:
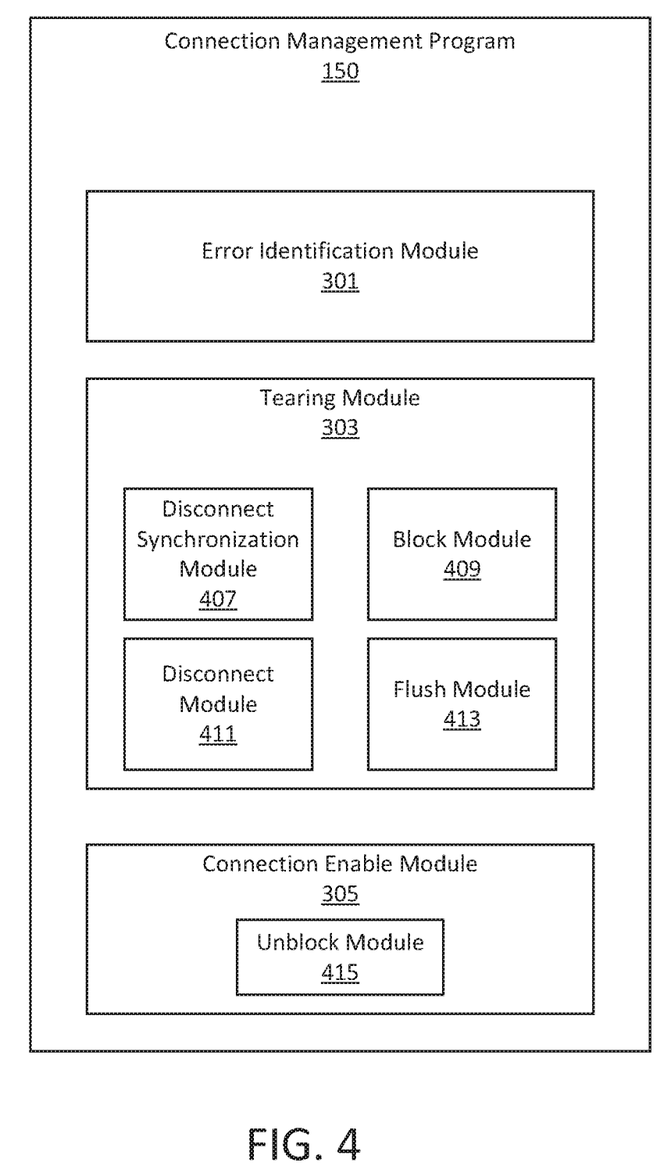
FIG. 4 is a block diagram illustrating another embodiment of connection management program for providing transaction fencing in a multi-domain network.

FIG. 4 is a block diagram illustrating a further embodiment of a connection management program 150 for providing transaction fencing in a multi-domain network. The connection management program 150, in various embodiments, may be substantially similar to the connection management program 150 described above with regards to FIG. 3. In the depicted embodiment, the connection management program 150 may include an error identification module 301, a tearing module 303, and a connection enable module 305, which may be configured substantially similar as described above with regards to the error identification module 301, the tearing module 303, and the connection enable module 305 of FIG. 3.

In additional embodiments, the tearing module 303 may include a disconnect synchronization module 407, a block module 409, a disconnect module 411, and a flush module 413. As described herein, the disconnect synchronization module 407 may synchronize the disconnection of source domains 111 from the destination node 109. Also, as described herein, the block module 409 may block connection requests that are associated with the destination node 109. Further, as described herein, the disconnect module 411 may disconnect connections between the source node 107 (plurality of source domains 111) and the destination node 109 (plurality of destination domains 113). Moreover, as described herein, the flush module 413 may flush outstanding transactions between the source node 107 and the destination node 109. Further, the connection enable module 305 may include an unblock module 415. As described herein, the unblock module 415 may unblock connection requests associated with the connection of the plurality of source domains 111 to the plurality of destination domains 113.

As used herein, the block module 409 may block connection requests from a plurality of domains to a plurality of domains, where the connection requests are associated with the source node 107 and the destination node 109. The block module 409 may identify the connection between a source domain 111 and the destination domain 113, where a communication error takes place. For example, the block module 409 may determine that the communication error has taken place between a source domain 111 and a destination domain 113. When the block module 409 identifies the connection associated with a communication error, the block module 409 may block subsequent connection requests between the source node 107 (e.g., all source domains 111) and the destination node 109 (e.g., all destination domains 113). For example, when the block module 409 blocks connection requests to the destination node 109, if a given source domain 111 is not connected with the destination node 109, the block module 409 may block the source domain 111 from sending connection requests to the destination node 109. Similarly, when the connection block to destination node 109 is active, the block module 409 will prevent connection module 305 from allowing connections from the destination node 109 (all destination domains 113) to the source domain 111.

In certain embodiments, the block module 409 may maintain a separate block connection indicator for each domain in a networked computer system 105 in a memory shared by the multiple domains in the networked computer system 105. As described above, a block connection indicator indicates to the multiple domains whether or not connection requests are blocked for a particular domain. When the block module 409 on the source node 107 determines that a connection between a source domain 111 and the destination domain 113 has encountered an error, the source domain 111 that has encountered the communication error may check the block connection indicator associated with destination domain 113 to verify that the connection block is active. If the block connection indicator associated with the destination domain 113 does not indicate that the destination domain 113 is currently blocked from forming connections, the source domain 111 may set the block connection indicator to indicate that connection requests associated with the destination domain 113 are blocked. Similarly, when a communication error is detected on a destination domain 113 of the destination node 109, the blocking module 409 may initiate a blocking indicator in the destination domain 113 to block connection requests from the source domain 111.

In certain embodiments, the block module 409 may maintain a block connection indicator for each destination node 113 in a networked computer system 105 in a memory shared by the multiple source domains 111 in the networked computer system 105. In some embodiments, a single communication error between a source and destination domains can block connections between all source domains 111 of a source node 107 and all destination domains 113 of a destination node 109.

In some embodiments, when a source domain 111 sets a block connection indicator to active for a destination node 109, the block module 409 may set a block counter associated with the destination node 109. The block counter may indicate the number of source domains 111 that communicate with the destination node 109. Further, each source domain 111 may be sent a block message associated with the destination node 109. When a source domain 111 receives the block message, the source domain 111 may mark the destination node 109 as blocked in a connectivity matrix maintained by the source domain 111. When a destination domain 113 is marked as blocked within a connectivity matrix, the source domain 111 that maintains a connectivity matrix may not send a connection request to the destination node 109 and the source domain 111 may not allow connection requests from the destination node 109. Additionally, the source domain 111 may decrement the block counter set by the block module 409.

In further embodiments, when the block counter is decremented to zero, the last source domain 111 to decrement the block counter may indicate to the disconnect module 411 to disconnect established connections between the destination node 109 and connected source domains 111. For example, the disconnect module 411 may initialize a disconnect counter when a source domain 111 decrements the block counter to zero. For example, the disconnect module 411 may send a disconnect message to the source domains 111 that are connected to the destination node 109. When a source domain 111 receives a disconnect message, the source domain 111 may initiate a disconnect process that disconnects the source domain 111 from the destination node 109. For example, the disconnect module 411 may disconnect send and received half duplex connections. As part of a disconnect process, the source domain 111 may disconnect both send and receive channels that are connected with the destination node 109. When both the send and receive channels are disconnected, the source domain 111 may decrement the disconnect counter maintained by the disconnect module 411.

In some embodiments, the disconnect synchronization module 407 may synchronize the disconnection of the plurality of source domains from the destination node 109. For example, the various source domains 111 may maintain an event queue for synchronizing the disconnect process across the various source domains 111.

In certain embodiments, when the source domains 111 are disconnected from the destination node 109, the last source domain 111 that disconnects from the destination node 109 may decrement the disconnect counter to zero. When the disconnect counter is decremented to zero, the flush module 413 may flush outstanding transactions for the source domains 111 that were connected with the destination node 109. For example, when a source domain 111 decrements the disconnect counter to zero, the decrementing source domain 111 may direct the flush module 413 to initialize a flush transactions counter and may send a flush outstanding transactions message to the source domains 111. The flush module 413 may initialize the flush transactions counter to a number of source domains 111 that communicate with the destination node 109.

In some embodiments, the flush outstanding transactions message directs the source domains 111 to flush all initiator transactions and target transactions associated with a disconnected node. For example, when a source domain 111 flushes an initiator transaction, the transaction may be returned with an aborted status. Additionally, when a destination domain 113 flushes a target transaction, the target transaction may be aborted and if it cannot be aborted immediately (e.g., because a background store or load operations are in progress and context of the transaction has a reference), the target transaction may be marked to be aborted, and it will be aborted when the background operation completes. Eventually, the flushing of the outstanding transactions completes when the outstanding transactions return with an abort status to the source domain 111. When the flushing of the outstanding transactions completes, the source domain 111 may decrement a flush transactions counter and check the value of the flush transactions counter.

In certain embodiments, when the source domains 111 complete flushing the outstanding transaction, the last source domain 111 to flush the outstanding transactions associated with the destination domain 113, may decrement the flush transactions counter to zero. When the flush transactions counter is decremented to zero, the unblock module 415 may unblock connection requests associated with the destination domain 113. For example, the last source domain 111 to flush transactions may access the block connection indicator for the destination node 109 and change it to indicate that connection requests associated with the destination node 109 are not actively blocked. Additionally, the source domain 111 may send an unblock connection message to all source domains 111. Accordingly, when the source domains 111 receive the unblock connection message, the source domains 111 may proceed with reforming connections with the destination node 109. Similarly, when each source domain 111 receives a connection request from the destination node 109, such connection requests will be processed and accepted since there is no active block set. When connections are reestablished, normal I/O operations may resume.

In certain embodiments, the block module 409 may block I/O requests in all source domains 111 until all source domains 111 establish connectivity with the destination node 109. This allows connection management program 150 to avoid full disconnect synchronization if one of the source domains 111 encounters a communication error while reconnecting to the destination node 109. This can happen if a link goes down while reconnecting or if a timeout in establishing a connection takes place. Blocking I/O requests until all source domains 111 complete establishing connectivity to the destination node allows avoiding re-synchronization loops after connections are unblocked—each source domain 111 that encounters a communication error during reconnect process may proceed to retry the connection without synchronizing with other domains of the node, since there are no pending transactions that may cause data corruption and that may need to be synchronized.

Thus, before the connection block is removed and source domains 111 are notified about the removal of the block, the unblock module 415 may initialize the reconnect counter to be equal to the number of source domains that need to be connected to the destination node 109. When a source domain 111 is requested to send a transaction to destination node 109, the source domain 111 may check the reconnect counter of the associated destination node. If the reconnect counter is not zero, the source domain 111 may return an immediate error (e.g., a BUSY status), without sending the transaction request to the destination node 109, even if the source domain 111 is already connected to the destination node 109. Similarly, if a destination domain 113 receives a transaction request from the source node 107, it may check the reconnect counter of the associated source node. If the reconnect counter is not zero, the target node may reply with transaction error (e.g., a BUSY status). Each source domain 111 that completes establishing the connectivity may decrement the reconnect counter. In this manner, the last source domain 111 that connects to the destination node 109 will set the reconnect count to zero and all new I/O requests to destination node 109 will be allowed.

In some embodiments, a destination node 109 may fail. When the destination node 109 fails, the unblock module 415 may not remove the connection block to the destination node 109. Here, connections to the failed node are not resumed after the flushing transactions complete.

Figure 5:
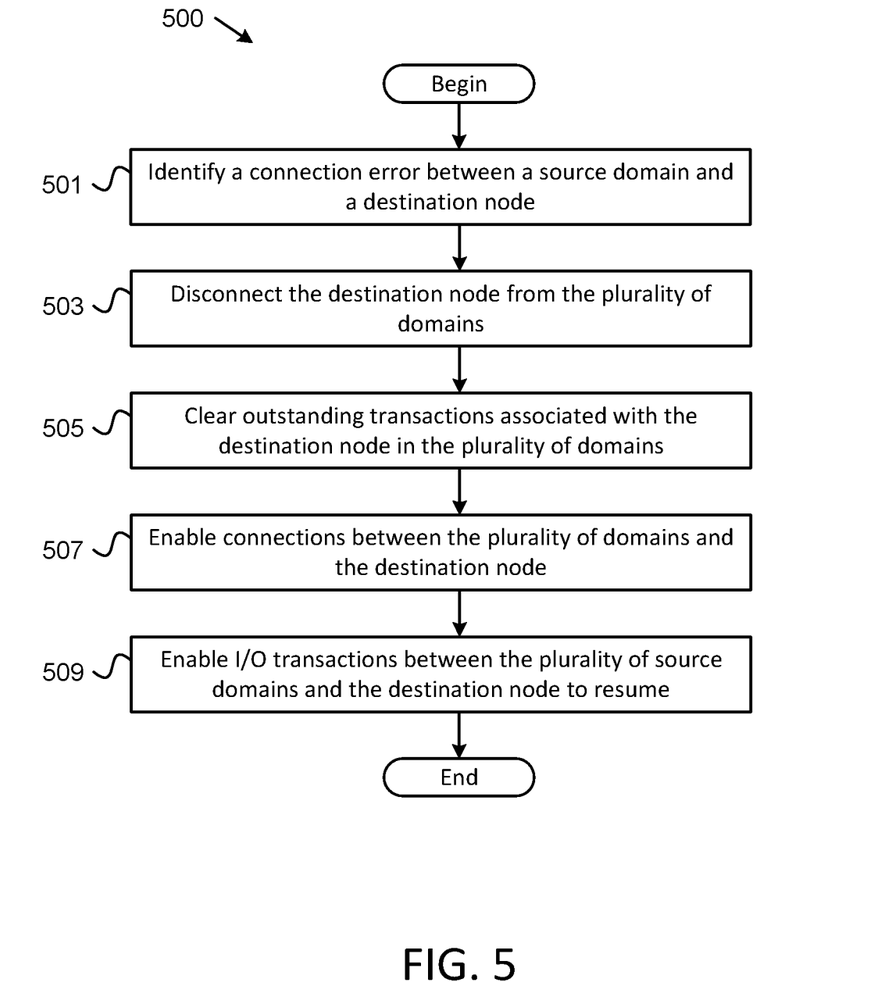
FIG. 5 is a flowchart diagram illustrating an embodiment of a method for providing transaction fencing in a multi-domain network.

FIG. 5 is a flow diagram illustrating an additional method 500 for providing transaction fencing in a multi-domain network. In certain embodiments, the method 500 proceeds at 501, where a communication error is identified between a source domain 111 and a destination domain 113. Further, the method 500 proceeds at 503, where the destination node 109 is disconnected from the plurality of source domains 111. Additionally, connection requests from the source domains 111 to the destination domains 113 may not be allowed. Also, connection requests from destination domains 113 to source domains 111 may be blocked. Further, the method 500 may proceed at 505, where outstanding transactions associated with the destination node 109 (e.g., the plurality of destination domains 113) may be cleared. For example, the source domains 111 may flush outstanding transaction that are associated with the destination domains 113. Additionally, the method 500 proceeds at 507, where connections between the plurality of source domains 111 and the destination node 109 are enabled. When connections are enabled, the source domains 111 are allowed to send connection requests to the destination node 109 (e.g., the destination domains 113), and connection requests from the destination domains 113 are accepted in the source domains 111. Further, the method 500 may proceed to 509, where normal I/O transactions (e.g., I/O operations) between the plurality of source domains 111 and the destination node 109 are enabled to resume. Normal I/O transactions and/or I/O operations may resume when all the source domains 111 connect to the destination node 109.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
an error identification module that identifies a communication error between a source domain in a source node and a destination domain in a destination node, wherein the communication error is associated with a connection in a plurality of connections between a plurality of source domains in the source node and a plurality of destination domains in the destination node;
a tearing module that disconnects the plurality of destination domains from the plurality of source domains and clears outstanding transactions associated with the source domain and the destination domain; and
a connection enable module that enables connections between the plurality of source domains and the plurality of destination domains,
wherein:
the tearing module comprises a disconnect synchronization module for synchronizing the disconnection of the plurality of source domains from the plurality of destination domains, and
at least a portion of each of said error identification module, said tearing module, and said connection enable module comprises one or more of a set of hardware circuits, a set of programmable hardware devices, and executable code stored on a set of non-transitory computer-readable storage media.

2. The system of claim 1, wherein the tearing module comprises:
a block module that blocks connection requests for the plurality of source domains, wherein blocking the connection requests blocks I/O requests in all source domains until all the source domains establish connectivity with the destination node;
a disconnect module that disconnects connections between the destination node and one or more source domains in the plurality of source domains; and
a flush module that flushes outstanding transactions for one or more other destination domains that are associated with the destination node;
wherein at least a portion of each of said block module, said disconnect module, and said flush module comprises one or more of a set of hardware circuits, a set of programmable hardware devices, and executable code stored on a set of non-transitory computer-readable storage media.

3. The system of claim 2, wherein the outstanding transactions comprise at least one of:
outstanding initiator transactions; and
outstanding destination transactions.

4. The system of claim 3, wherein the flush module marks the outstanding destination transactions as aborted.

5. The system of claim 3, wherein the flush module requests a return of the outstanding initiator transactions from the plurality of source domains.

6. The system of claim 2, wherein the flush module processes outstanding completions.

7. The system of claim 2, wherein the disconnect module disconnects the connections by disconnecting send and receive half-duplex connections.

8. The system of claim 1, wherein the tearing module disconnects the connections based on an Infiniband specification.

9. The system of claim 1, wherein the connection enable module fails the destination node if connectivity between the source domain and the destination domain fails to resume.

10. The system of claim 1, wherein the connection enable module further comprises an unblock module that unblocks connection requests associated with the destination node for the plurality of source domains.

11. The system of claim 1, wherein the plurality of connections between the plurality of source domains and the plurality of destination domains are established through forming half-duplex send connections between the plurality of source domains and the plurality of destination domains.

12. A method, comprising:
identifying a communication error between a source domain in a source node and a destination domain in a destination node, wherein the communication error is associated with a connection in a plurality of connections between a plurality of source domains in the source node and a plurality of destination domains in the destination node;
disconnecting the plurality of destination domains from the plurality of source domains;
clearing outstanding transactions associated with the source domain and the destination domains; and
enabling connections between the plurality of source domains and the plurality of destination domains,
wherein disconnecting the plurality of destination domains from the plurality of source domains comprises synchronizing the disconnection of the plurality of source domains from the plurality of destination domains.

13. The method of claim 12, wherein clearing outstanding transactions further comprises flushing outstanding transactions for one or more other destination domains that are associated with the destination node.

14. The method of claim 13, wherein flushing outstanding transaction further comprises:
marking outstanding destination transactions as aborted;
requesting a return of outstanding initiator transactions from the plurality of source domains; and
processing outstanding completions.

15. The method of claim 12, wherein enabling connections between the plurality of source domains and the plurality of destination domains further comprises failing the destination node if connectivity between the source domain and the destination node fails to resume.

16. The method of claim 12, wherein enabling connections between the plurality of source domains and the plurality of destination domains further comprises unblocking connection requests associated with the destination node for the plurality of source domains.

17. The method of claim 12, further comprising:
blocking connection requests for the plurality of domains, wherein blocking the connection requests blocks I/O requests in all source domains until all the source domains establish connectivity with the destination node;
disconnecting connections between the destination node and one or more domains in the plurality of domains; and
flushing outstanding transactions for one or more other domains that are associated with the destination node.

18. A computer program product comprising a computer-readable storage medium including program instructions embodied therewith, the program instructions executable by a processor to cause the processor to:
identify a communication error between a source domain in a source node and a destination domain in a destination node, wherein the communication error is associated with a connection in a plurality of connections between a plurality of source domains in the source node and a plurality of destination domains in the destination node;
disconnect the plurality of destination domains from the plurality of source domains;
clear outstanding transactions associated with the source domain and the destination domain; and
enable connections between the plurality of source domains and the plurality of destination domains,
wherein disconnecting the plurality of destination domains from the plurality of source domains comprises synchronizing the disconnection of the plurality of source domains from the plurality of destination domains.

19. The computer program product of claim 18, wherein the program instructions further cause the processor to:
block connection requests for the plurality of domains, wherein blocking the connection requests blocks I/O requests in all source domains until all the source domains establish connectivity with the destination node;
disconnect connections between the destination node and one or more domains in the plurality of domains; and
flush outstanding transactions for one or more other domains that are associated with the destination node.

20. The computer program product of claim 18, wherein clearing the outstanding transactions comprises flushing outstanding transactions for one or more other destination domains that are associated with the destination node.

\* \* \* \* \*